/ Patented Apr. 3, 1951

2,547,782

UNITED STATES PATENT OFFICE 2,547,782

2-CHLOROPROCAINE SALT OF PENICILLIN

Harley W. Rhodehamel, Jr., Indianapolis, Ind., assignor to Eli Lilly and Company, Indianapolis, Ind., a corporation of Indiana No Drawing. Application October 26, 1948, Serial No. 56,681

7 Claims. (Cl. 167—65)

My invention relates to penicillin and more particularly to a novel and useful salt of penicillin.

An object of my invention is to provide an insoluble salt of penicillin. Another object is to provide a process whereby the isolation of substantially pure penicillin from a solution of crude penicillin may be accomplished readily. Another object is to provide an insoluble salt of penicillin capable of prolonging the therapeutic effectiveness of penicillin. Other objects will be apparent from the following description of my invention.

In the accomplishment of the above and other objects, I have provided a novel penicillin salt which displays a low solubility in water and the common organic solvents, thereby affording a convenient means of isolating penicillin from solutions thereof. Moreover, my novel penicillin salt when administered in suitable therapeutic form as described hereinafter, will provide a therapeutically effective blood concentration of penicillin for a period of 24 hours or more.

My novel penicillin salt comprises the 2-chloroprocaine salt of penicillin and may be represented by the following formula

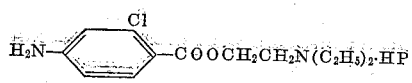

wherein HP represents the acidic form of penicillin.

My novel chemical compound may be prepared by chemical reactions of addition or metathesis. Thus, for example, the acidic form of penicillin may be reacted with the basic 2-chloroprocaine, or a metallic or metallic-like salt of penicillin may be reacted with an acid addition salt of 2-chloroprocaine, the reactions preferably being carried out in a solvent in which all of the chemical components except the 2-chloroprocaine salt of penicillin are soluble.

As used hereinabove the term "penicillin" is used in its generic sense as inclusive of the several penicillins produced by the customary mold-growth processes of penicillin production. Thus by the term "penicillin" I include the several particular penicillins known to be produced by the usual mold-growth methods. Illustrative of the mold-growth products are penicillin G (benzylpenicillin), penicillin F, penicillin dihydro F, penicillin K, penicillin X and the like.

For the sake of convenience, the following examples and illustrations which set forth the several aspects of my invention generally will be drawn with respect to benzyl penicillin, but it is to be understood that my invention is not limited to this particular penicillin but may be employed with substantially the same results with other penicillins normally produced by penicillin-producing molds.

Example 1

40 g. of pure sodium benzyl penicillin are dissolved in 5 liters of cold (5° C.) water. Sufficient sulfuric acid is added to reduce the pH of the solution to about 2.2, and the aqueous solution is extracted with about 5 liters of amyl acetate. To the amyl acetate extract which contains benzyl penicillin in its acidic form are added slowly and with vigorous stirring 500 ml. of a cold solution of amyl acetate having dissolved therein about 32 g. of 2-chloroprocaine. Upon addition of the 2-chloroprocaine solution, white crystals of the 2-chloroprocaine salt of benzyl penicillin separate. The crystals are separated by filtration, washed with acetone and dried in an evacuated chamber.

Example 2

A solution of penicillin (substantially benzyl penicillin but containing some penicillins F, dihydro F, and K) in amyl acetate is obtained according to known commercial methods by growing a penicillin-producing mold and extracting the mold-growth culture medium with amyl acetate and clarifying the extract. To 10 liters of this amyl acetate solution containing about 9 g. of penicillin in acidic form are added slowly and with stirring, 200 ml. of amyl acetate wherein 7 g. of 2-chloroprocaine are dissolved. After all of the 2-chloroprocaine solution is added, stirring is continued for about 2 hours to assure the substantially complete precipitation of the 2-chloroprocaine salt of penicillin. The crystalline salt is then filtered off and dried.

The penicillin is recovered from its insoluble 2-chloroprocaine salt as follows: 0.5 g. of the 2-chloroprocaine salt of penicillin are dissolved in about 400 ml. of cold water and sufficient sulfuric acid is slowly added to acidify the solution to about pH 2. The acidified mixture is extracted with about 100 ml. of amyl acetate, whereupon the penicillin dissolves in the amyl acetate and the 2-chloroprocaine in the form of its sulfate salt dissolves in the aqueous phase. The amyl acetate layer is separated from the aqueous layer, and the penicillin is recovered in purified form from the amyl acetate by extraction of the amyl acetate with dilute aqueous alkali, or by way of the other known isolated procedures. By isolation procedures of the above and similar character, substantial purification of the penicillin may be effected, the degree of purification being as much as 25 percent or more when relatively crude penicillin preparations are employed.

Example 3

To a solution of 5 g. of the potassium salt of substantially pure benzyl penicillin in 100 ml. of cold water, is added slowly and with stirring a solution of 4.5 g. of 2-chloroprocaine hydrochloride dissolved in 100 ml. of water. The 2-chloroprocaine salt precipitates in crystalline form. The salt is separated by filtration and dried.

Example 4

To 500 ml. of an aqueous solution containing a mixture of the impure sodium salts of penicillins G, F, dihydro F, and K in the amount of about 20 g., are added about 22 g. of 2-chloroprocaine sulfate, dissolved in 200 ml. of water. The precipitate of the 2-chloroprocaine salt of penicillin which separates is filtered off and dried.

The 2-chloroprocaine salt of penicillin which may be prepared by the above and other similar methods displays an extremely low solubility in water and the common organic solvents. Illustratively, the water solubility of the 2-chloroprocaine salt of benzyl penicillin approximate 0.25 percent (weight-volume) at 29° C. The empirical formula of the salt corresponds to $C_{29}H_{37}O_6N_4SCl$, and the molecular weight is 604. The purified 2-chloroprocaine salt of benzyl penicillin melts at about 92–94° C. and the 2-chloroprocaine salts of penicillin F, dihydro F, etc., have melting points approximating the above value.

For therapeutic purposes the 2-chloroprocaine salt of penicillin is administered intramuscularly as a finely-divided suspension of the salt in a liquid vehicle. Suitable vehicles for the provision of injectable suspensions include aqueous and oleaginous vehicles, for example water, and vegetable oils such as cottonseed oil, sesame oil and the like. As will be readily understood, the particle size of the salt should be sufficiently small to permit the particles to pass readily through the lumen of a hypodermic needle without packing within and blocking the needle. Illustratively, a particle size which avoids blocking of a 20-gauge needle is that which will readily pass through a 200-mesh screen.

By way of illustration, an aqueous medicinal composition which upon intramuscular injection is capable of maintaining a therapeutically effective blood level of penicillin for a period of at least 24 hours comprises a suspension containing about 300 mg. of the finely divided 2-chloroprocaine salt of benzyl penicillin per ml. of water.

Since, as is known, penicillin is relatively unstable in the presence of appreciable amounts of moisture, aqueous compositions containing the 2-chloroprocaine salt of penicillin should be used within a comparatively short time after their preparation. For this reason it is often desirable to provide medicinal compositions comprising suspensions of the 2-chloroprocaine salt of penicillin in oleaginous vehicles. A suitable oleaginous composition is prepared by suspending in 10.5 ml. of cottonseed oil 5 g. of the 2-chloroprocaine salt of penicillin ground to such particle size that all of the material will pass through a 200-mesh screen. Intramuscular injection of 1 ml. of this suspension will maintain a therapeutically effective blood concentration of penicillin for at least 24 hours.

An additional illustrative example of a medicinal composition comprises a suspension in 127 ml. of sesame oil of 57 g. of the 2-chloroprocaine salt of benzyl penicillin ground to 200-mesh screen size. A medicinal preparation having these proportions contains about 300,000 Oxford units of penicillin per ml., and when administered intramuscularly in an amount of 1 ml. is capable of maintaining for at least 24 hours an effective blood concentration of penicillin greater than about 0.03 Oxford unit per ml. of blood, this concentration being considered the minimal effective concentration.

It is to be understood that the above-mentioned medicinal preparations are given by way of illustration only and it will be apparent to those skilled in the art that there may be prepared numerous modifications and variations of the medicinal compositions as set forth herein.

The preparation of 2-chloroprocaine is given below:

A mixture of 64 g. of 2-chloro-4-nitrobenzoic acid and 40 ml. of thionyl chloride is heated under reflux on a steam bath for about 4 hours. The mixture is then distilled and the 2-nitro-4-chlorobenzoyl chloride which boils at about 150° C./8 mm. pressure is collected.

To a refluxing solution of 28.6 g. of β-diethylaminoethanol in 500 ml. of benzene are added slowly and with stirring 53.5 g. of 2-chloro-4-nitrobenzoyl chloride. Refluxing is continued for one hour after the addition is completed. The mixture is cooled and the hydrochloride salt of the β-diethylaminoethyl 2-chloro-4-nitrobenzoate which has precipitated is filtered off and purified by recrystallization from ethanol.

55 g. of β-diethylaminoethyl 2-chloro-4-nitrobenzoate hydrochloride are dissolved in 150 ml. of water, 0.5 g. of Adams $PtO_2$ catalyst are added and the mixture is hydrogenated with hydrogen at about 50 pounds' pressure. The mixture is filtered to remove the catalyst and evaporated to dryness. The residue consisting of 2-chloroprocaine hydrochloride is purified by recrystallization from ethanol. 2-chloroprocaine hydrochloride melts at about 170–171° C.

2-chloroprocaine base is obtained by dissolving 2-chloroprocaine hydrochloride in water, making the solution alkaline with sodium hydroxide, extracting with ether the 2-chloroprocaine which separates as an oil, and evaporating the ether.

I claim:

1. A compound represented by the following formula

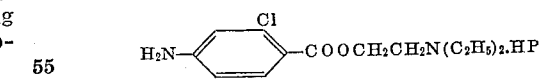

wherein HP represents the acidic form of penicillin.

2. A compound according to claim 1 wherein the penicillin is benzyl penicillin.

3. A therapeutic composition comprising a liquid, injectable suspending medium and solid 2-chloroprocaine salt of penicillin in finely-divided particle size, said penicillin salt being present in an amount greater than will dissolve to saturate the suspending medium.

4. A composition according to claim 3 in which the suspending medium is an aqueous suspending medium.

5. A composition according to claim 4 in which the penicillin salt is a salt of penicillin G.

6. A composition according to claim 3 in which the suspending medium is an oleaginous suspending medium.

7. A composition according to claim 6 in which the penicillin salt is a salt of penicillin G.

HARLEY W. RHODEHAMEL, Jr.

REFERENCES CITED

The following references are of record in the file of this patent:

Heyden Report CMR–H–4 (PB 80017), Aug. 15, 1947, pp. 1 and 2.

Monash: "Science," vol. 107, Oct. 17, 1947, page 370.

Drug and Cosmetic Industry, Nov. 1947, page 595.